Sept. 20, 1938.        H. W. ALEXANDER        2,130,528
TOOL CUTTING MACHINE EQUIPPED WITH RESISTANCE MECHANISM
Filed Oct. 2, 1937

INVENTOR
BY Harold W. Alexander
Harold E. Cole
ATTORNEY

Patented Sept. 20, 1938

2,130,528

UNITED STATES PATENT OFFICE 2,130,528

TOOL CUTTING MACHINE EQUIPPED WITH RESISTANCE MECHANISM

Harold W. Alexander, Victoria, British Columbia, Canada

Application October 2, 1937, Serial No. 167,043

11 Claims. (Cl. 29—57)

This invention relates to means for causing relative speeds between a driving member and a driven member, both of which are rotated, and more especially means to control the relative speeds of a cutting tool and the work to be cut where a source of power is applied to drive only the cutting tool, the work being driven only when engaged with said cutting tool. The invention is also applicable when the source of power is applied to drive the work only.

Heretofore in the use of hand or automatic screw machines where a work spindle revolves at a given speed and it is necessary to reduce the rotating speed of a cutting tool or the like below that given speed, this has been heretofore accomplished by connective gearing that results in driving the cutting tool as well as the work spindle, but at different speeds. The principal object of my invention is to attain this relative speed of rotation of the cutting tool and work spindle by providing resistance mechanism to retard the speed of rotation of the cutting tool or other member that is driven by engagement with the work spindle, or vice versa. This resistance mechanism may be fluid controlled with a valve, or may be electromagnetic type or use ordinary braking means, which resistance mechanism is applied directly to the driven member. In other words as between the two members, one being driven and the other doing the driving, as is the case between a work spindle and a cutting tool brought into engagement with each other, this resistance mechanism is applied to the driven member to thereby retard its speed of rotation.

With my invention by the mere adjustment of a valve or other control means any relative speed between the driving and driven members may be attained, wholly dispensing with connective gearing or other cumbersome power transmitting elements which at best, are very limited in their speed gradations.

The foregoing and other objects which will appear as the nature of the invention is better understood, may be accomplished by a construction, combination and operative arrangement of parts such as is disclosed by the drawing and specification. The nature of the invention is such as to render it susceptible to various changes and modifications, and, therefore, I am not to be limited to said disclosure; but am entitled to all such changes therefrom as fall within the scope of my claims.

Figure 1:
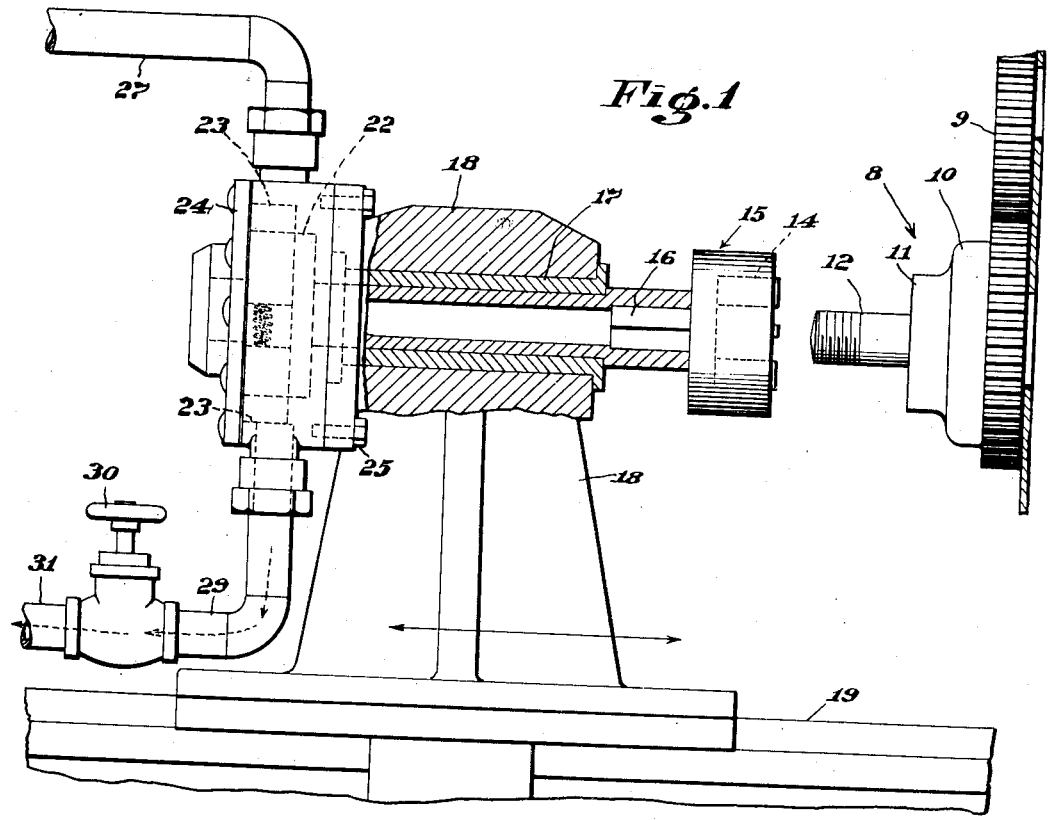
Figure 1 is a side elevational view, partly in section, of a cutting tool machine, showing it equipped with fluid-operated resistance mechanism.

As illustrated, there is a work member 8 having a rotatable work chuck or spindle 10 driven by a driving gear 9 connected to some suitable source of power, not shown. Said work chuck 10 has a collet 11 which holds the work 12, which may be a bar of material or pin or anything that is to be cut or otherwise worked upon.

A cutting tool 15 has a self-opening die 14 of well known construction, fitted at one end into a hollow spindle 16 which rotates in a bearing 17 that is set in a housing 18 which is slidably mounted on a base 19, so that said cutting tool can be moved into and out of engagement with said work 12 as desired by sliding said housing.

Said cutting tool is equipped with resistance mechanism having a rotor 22 fixed to one end of said spindle 16. There are a plurality of vanes 23 which are attached to and rotate with said rotor in a casing 24. These parts form what is commonly known as a vane pump which rotates with said spindle 16. Bolts 25 hold said casing 24 to said housing 18. A liquid supply conduit 27 communicates with said casing 24, and a return conduit 29 communicates with said casing and has a control valve 30, beyond which is a conduit 31, shown broken away, which communicates with a source of supply not shown or with said supply conduit 27. Any suitable oil or other liquid will serve the purpose.

As between the said work member 8 and the said cutting tool 15, one is a driver member and the other a driven member, and while I have shown the said work member 12 as the driver member and the said cutting tool 15 as the driven member, my machine is effective if the driving relation of the two were reversed, with the cutting tool 15 serving as the driver and the said work member 8 driven by it and equipped with the resistance mechanism.

Different relative speeds of the driver member and driven member are attained when they are engaged by the mere operation or adjustment of said valve 30. When it is completely open the driven member 15, when moved into engagement with the driver member 8 is rotated at substantially the same speed as said driver member. To reduce the speed of said driven member 15 relative to said driver member 8 the valve is partly closed which results in retarding the passage of the fluid about the vane pump and through said casing 24 thereby retarding the speed of rotation of said driven member. Further closing of said valve 30 tends to further hold the fluid and thereby further retards the speed of said driven member, and its complete closure will stall said driven member by preventing any circulation of said fluid. The finest gradations of speed of rotation of said driven member can be attained by merely setting the valve at a predetermined point, and as different degrees of relative speed between the driver member and driven member are required to do different kinds of work the wide range of control my resistance mechanism exercises over the speed of rotation of said driven member makes it effective immediately for many kinds of machine tool work.

Figure 2:
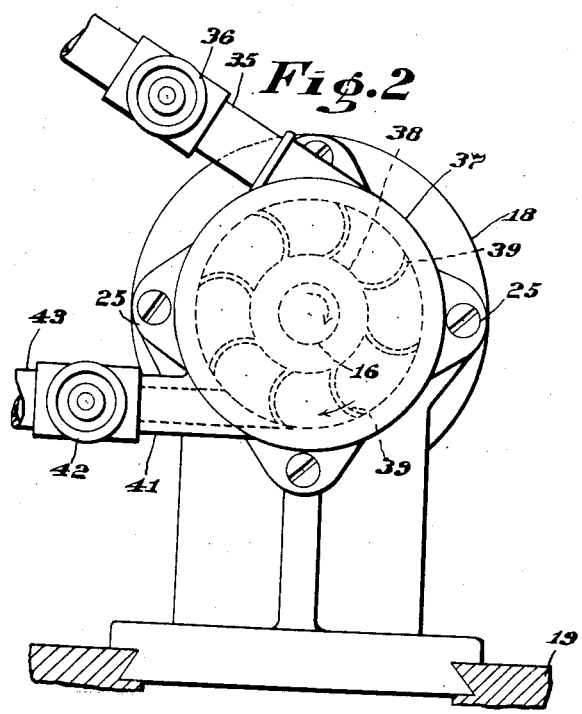
Figure 2 is an end elevational view of resistance mechanism for said machine of the pneumatic type.
Figure 3:
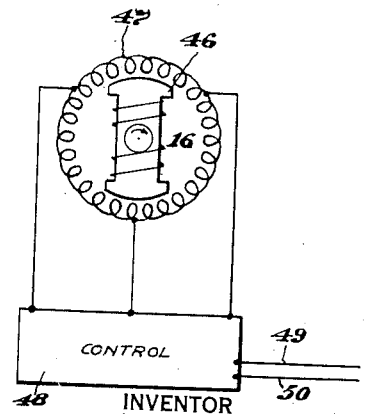
Figure 3 is a diagrammatic view of an electromagnetic resistance mechanism for said machine.

Instead of using liquid as the resistance fluid, pneumatic mechanism may be provided to use air, as illustrated in Figure 2 of the drawing. A conduit 35 for the inflow of air to a casing 37 with which it communicates, is equipped with a control valve 36. Within said casing 37 is a rotor 38 having vanes 39, which rotor is fixed to the said spindle 16 and rotates therewith. Another conduit 41 communicates with said casing 37 and serves as an air outlet, being equipped with a control valve 42, beyond which is a return conduit which communicates with a source of supply not shown. So long as said valves 36 and 42 are wide open the air circulates freely around said vanes 39 and through said casing 37, and there is no appreciable resistance to the rotating movement of said spindle 16; but partial closure of said valves will result in the creation of braking resistance to said vanes 39 with the result that the speed of rotation of said spindle 16 is retarded in proportion to the degree of closure of said valves. With this arrangement the casing 37 must be air tight, and the air could be forced thereinto under pressure.

The resistance mechanism may be of the electro-magnetic type, utilizing an armature 46 attached to the end of said spindle 16, a resistance coil 47, a control panel 48 and circuit wires 49 and 50, these being well known elements in use in the electro-magnetic industry. This type of mechanism creates resistance to any desired degree by controlling the flux in the usual manner through adjustment of said control panel 48.

What I claim is:

1. In combination, a tool cutting member and a work member, one said member being adapted to engage the other, one said member being driven by the other when they are in engagement with each other, and operable resistance mechanism connected to said driven member adapted upon actuation to variantly retard the movement of said driven member during the cutting operation.

2. In combination, a tool cutting member and a work member, one said member being adapted to engage the other, one said member being driven by the other when they are in engagement with each other, and operable resistance mechanism connected to said driven member having adjusting means adapted upon actuation to variantly retard the movement of said driven member during the cutting operation.

3. In combination, a tool cutting member and a work member, one said member being movable towards and into engagement with the other, one said member being adapted to be driven by the other when they are moved into engagement with each other, said driven member embodying a rotatable shaft, and operable resistance mechanism connected to said driven member adapted upon actuation to variantly retard the movement of said driven member during the cutting operation, said mechanism embodying a pump fixed to said shaft.

4. In combination, a tool cutting member and a work member, one said member being movable into engagement with the other, one said member being adapted to be driven by the other when they are moved into engagement with each other, said driven member embodying a rotatable shaft and operable resistance mechanism connected to said driven member adapted upon actuation to retard the movement of said driven member, said resistance mechanism embodying a pump fixed to said shaft, a casing outside of said pump, and conduit means connecting with said casing to supply fluid to and to permit fluid to escape from said pump, and a valve for said conduit means.

5. In combination, a tool cutting member and a work member, one said member being movable towards and to engage the other, one said member being adapted to be driven by the other when they are moved into engagement with each other, said driven member embodying a rotatable shaft, and operable resistance mechanism connected to said shaft adapted upon actuation to retard the movement of said driven member, said mechanism embodying a pump fixed to said shaft.

6. In combination, a tool cutting member and a work member, one said member being adapted to engage the other, and one said member being driven by the other when they are in engagement with each other, and resistance mechanism connected to said driven member, said mechanism embodying electro-magnetic means adapted upon actuation to apply resistance to the movement of said driven member.

7. In combination, a tool cutting member and a work member, one said member being movable towards and into engagement with the other, and one said member being adapted to be driven by the other when they are moved into engagement with each other, and resistance mechanism connected to said driven member, said mechanism embodying a rotatable member, and pneumatic means having instrumentalities to permit the flow of air to and from said rotatable member and instrumentalities adapted upon actuation to retard the said flow of air and thereby create resistance to the movement of said rotatable member.

8. A machine comprising a driving member, a base, a driven member having a housing mounted on and movable relative to said base towards said driving member, said driven member being rotatable in said housing, and resistance mechanism connected with said driven member having operative means adapted upon actuation to cause retardation of the speed of rotation of said driven member.

9. Resistance mechanism in combination with a member for tool cutting adapted to be rotatively driven, said resistance mechanism having a pump and conduit means to permit the flow of fluid to and from said pump, and valve means for said conduit means adapted upon operation to reduce the flow of said fluid whereby resistance will be created to the movement of said member.

10. Resistance mechanism in combination with tool cutting means embodying a housing, a bearing in said housing and a shaft rotatable in said bearing, a casing fastened to said bearing, a pump having vanes rotatable in said casing and fixed to said shaft, and conduit means in communication with said casing to permit the flow of fluid to and from said casing and pump, and valve means to control said fluid flow whereby it may be retarded in its passage from said casing and thereby create resistance to the rotation of said pump and said shaft.

11. Resistance mechanism in combination with a member for tool cutting embodying a housing and a shaft rotatable therein, said resistance member having a pump fixed to said shaft and conduit means to permit the flow of liquid to and from said pump, and valve means for said conduit means adapted upon operation to reduce the flow from said pump of said liquid whereby resistance will be created to the rotative movement of said shaft.

HAROLD W. ALEXANDER.